US008527405B1

(12) United States Patent
Das et al.

(10) Patent No.: US 8,527,405 B1
(45) Date of Patent: Sep. 3, 2013

(54) EARLY PAYMENT REWARDS SYSTEM AND METHOD

(75) Inventors: Jayanta Das, Broomall, PA (US); Mahesh Subramanian, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1088 days.

(21) Appl. No.: 12/044,220

(22) Filed: Mar. 7, 2008

Related U.S. Application Data

(60) Provisional application No. 60/991,388, filed on Nov. 30, 2007.

(51) Int. Cl.
*G06Q 40/00* (2012.01)

(52) U.S. Cl.
USPC .......................................................... 705/39

(58) Field of Classification Search
USPC ..................................................... 705/35–45
See application file for complete search history.

(56) References Cited

U.S. PATENT DOCUMENTS

| | | | |
|---|---|---|---|
| 6,049,778 A | 4/2000 | Alderucci et al. | |
| 6,754,840 B2 | 6/2004 | Poisner | |
| 7,421,409 B1 * | 9/2008 | Kraemer et al. | 705/37 |
| 7,668,772 B1 | 2/2010 | Bent et al. | |
| 7,870,048 B2 * | 1/2011 | Bhagwat | 705/35 |
| 8,019,667 B1 | 9/2011 | Bent et al. | |
| 8,249,921 B2 * | 8/2012 | Haley | 705/14.1 |
| 8,260,697 B1 | 9/2012 | Bent et al. | |
| 8,280,769 B2 | 10/2012 | Alderucci et al. | |
| 8,326,747 B2 | 12/2012 | Ang et al. | |
| 8,352,366 B1 * | 1/2013 | Keld | 705/40 |

(Continued)

OTHER PUBLICATIONS

Newman, Richard, "Amex offers short-term credit; Card keeps small firms' cash flowing", The Record. Bergen County, NJ: Nov. 26, 2007. p. A.13.*

(Continued)

*Primary Examiner* — Ella Colbert
*Assistant Examiner* — Mohammad Z Shaikh
(74) *Attorney, Agent, or Firm* — Goodwin Procter LLP

(57) ABSTRACT

Embodiments of the invention are directed to a computer-implemented method for reducing funding burden on a credit issuer by offering an early payment rewards program to qualified card holders. The method may include identifying card holders having a payment history illustrating payment of an entire credit balance each month, determining whether each of the identified card holders generates an account-related fee total not exceeding a pre-selected threshold, and selecting the card holders having a history of payment of the entire credit balance each month and generating account-related fees not exceeding the pre-selected threshold. The method may further include offering the early payment rewards program to the selected card holders, wherein upon enrollment in the early payment rewards program the selected card holders receive rewards for early payment behavior. Additional aspects of the method include receiving notification of a payment at an early payment rewards system, determining if the received payment generates early payment rewards, and evaluating the received payment based on retrieved early payment rules to calculate a reward amount. The method may further include adding the calculated reward amount to a participant account.

12 Claims, 9 Drawing Sheets

(56) References Cited

U.S. PATENT DOCUMENTS

| | | |
|---|---|---|
| 2002/0052852 A1 | 5/2002 | Bozeman |
| 2002/0116266 A1* | 8/2002 | Marshall .................. 705/14 |
| 2003/0105689 A1* | 6/2003 | Chandak et al. ............ 705/35 |
| 2004/0083170 A1 | 4/2004 | Bam |
| 2004/0267648 A1* | 12/2004 | Schaub .................... 705/35 |
| 2007/0112655 A1* | 5/2007 | Jones ..................... 705/35 |
| 2007/0174166 A1* | 7/2007 | Jones ..................... 705/35 |
| 2007/0192195 A1 | 8/2007 | Asmar et al. |
| 2008/0006690 A1 | 1/2008 | Rosenberger |
| 2008/0071622 A1 | 3/2008 | Alderucci et al. |
| 2008/0262919 A1* | 10/2008 | Ang et al. ................ 705/14 |
| 2008/0288396 A1* | 11/2008 | Siggers et al. ............ 705/39 |
| 2009/0210339 A1* | 8/2009 | Bhagwat .................. 705/38 |
| 2009/0254478 A1 | 10/2009 | Ang et al. |
| 2009/0259548 A1 | 10/2009 | Ang et al. |
| 2011/0087598 A1 | 4/2011 | Bozeman |
| 2013/0018716 A1 | 1/2013 | Alderucci et al. |

OTHER PUBLICATIONS

Green, Jeffrey, "Bank Card Profitablity Study: Annual Report", Cards & Payments, May 2006, pp. 1-4.*

Shermach, Kelly, "Special Report: Loyalty, Market Pressures Challenge Rewards-Program Profitablity", Cards&Payments, Jan. 2007, pp. 1-4.*

"Experian—Gallup Survey Shows Three in 10 Consumers Say its Hard to Make Ends Meet; Survey Also Finds that Women Are less Likely Than Men to Say They Pay Off Their Credit Card Expenses in Full Each Month", PR Newswire [New York], Apr. 17, 2007, pp. 1-5.*

Lindenmayer, Isabelle, "New Tacks for Sticky Debit Rewards Issue", American Banker, Mar. 14, 2006, vol. 171, issue 49, pp. 1-4.*

\* cited by examiner

EARLY PAYMENT REWARDS SYSTEM AND METHOD

PRIORITY

This application claims priority from provisional application Ser. No. 60/991,388, filed on Nov. 30, 2007.

TECHNICAL FIELD

Embodiments of the invention are related generally to systems and methods for reducing funding burden incurred by credit issuers without imposing additional rules or restrictions on card holders.

BACKGROUND OF THE INVENTION

Credit card issuers typically profit from interest and finance charges paid by credit card holders who maintain a revolving balance. However, some credit card holders do not maintain a revolving balance and instead pay off their entire balances during each billing cycle. These credit card holders are commonly labeled "transactors". Many of these transactors wait until very late in a billing cycle, and often until the last day of the billing cycle to pay off the balance. These transactors therefore use the credit card issuer to fund their purchases for an extended period of time. In fact, credit card holders with large monthly bills tend to wait longer to pay their bills in order to maximize their own interest earning capacity. For example, credit card holders with a monthly bill of $5000 or greater tend to wait until the due date to pay their credit bills. As a result of this behavior, credit issuers bear the cost of funding without the benefit of receiving any interest from the transactors.

Furthermore, these transactors seldom incur other fees such as late fees and fees for exceeding a pre-set credit limit. Although credit card issuers receive interchange revenues for all credit card users, these interchange revenues can be offset by other expenses, thereby rendering doing business with transactors entirely unprofitable. For example, transactors often select credit cards based on rewards and benefits that are offered to them for using their credit cards. These rewards and benefits provided may offset the interchange revenues obtained by the credit issuer, these rendering the transactor accounts entirely unprofitable. In some instances, depending on revolving balance, payment amounts, and payment dates, revolver accounts may also fail to provide sufficient profitability.

Thus, a solution is needed that identifies unprofitable transactor and revolver accounts and provides account features that are beneficial both to the credit card holder and the credit card issuer.

BRIEF SUMMARY OF THE INVENTION

In another aspect of the invention, a computer-implemented method for processing credit card payments is provided in order to reduce funding burden incurred by credit issuers by rewarding early payment for participating card holders. The method may include receiving notification of a payment made by a card holder at an early payment rewards system and determining if the received payment generates early payment rewards. The method may further include evaluating the received payment based on retrieved early payment rules to calculate a reward amount and adding the calculated reward amount to a participant account.

In an additional aspect of the invention, a computer-implemented method is provided for reducing funding burden on a credit issuer by offering an early payment rewards program to qualified card holders. The method may include identifying card holders having a payment history illustrating payment of an entire credit balance each month and determining whether each of the identified card holders generates an account-related fee total not exceeding a pre-selected threshold. The pre-selected threshold may be selected to be zero, such that the identified card holder accounts fail to generate account-related fees. The method may further include selecting the card holders having a history of payment of the entire credit balance each month and generating account-related fees not exceeding the pre-selected threshold and offering the early payment rewards program to the selected card holders. Upon enrollment in the early payment rewards program, the selected card holders receive rewards for early payment behavior.

In yet an additional aspect of the invention, a computerized credit card early payment rewards system is provided for reducing funding burden incurred by credit issuers by rewarding early payment for participating card holders. The system may include a card payment server exchange module for receiving payment data from a card payment server and an early payment rewards rules engine for applying early payment rewards rules to received payment data from participating card holders. The system may additionally include an early payment rewards calculator for calculating a reward amount based on application of the rules from the early payment rewards rules engine and participant interactive data components for depositing the calculated rewards in a participating card holder account.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for reducing credit issuer funding burden by inducing early payment through a rewards system that rewards eligible and participating cardholders for early payment.

Figure 1:
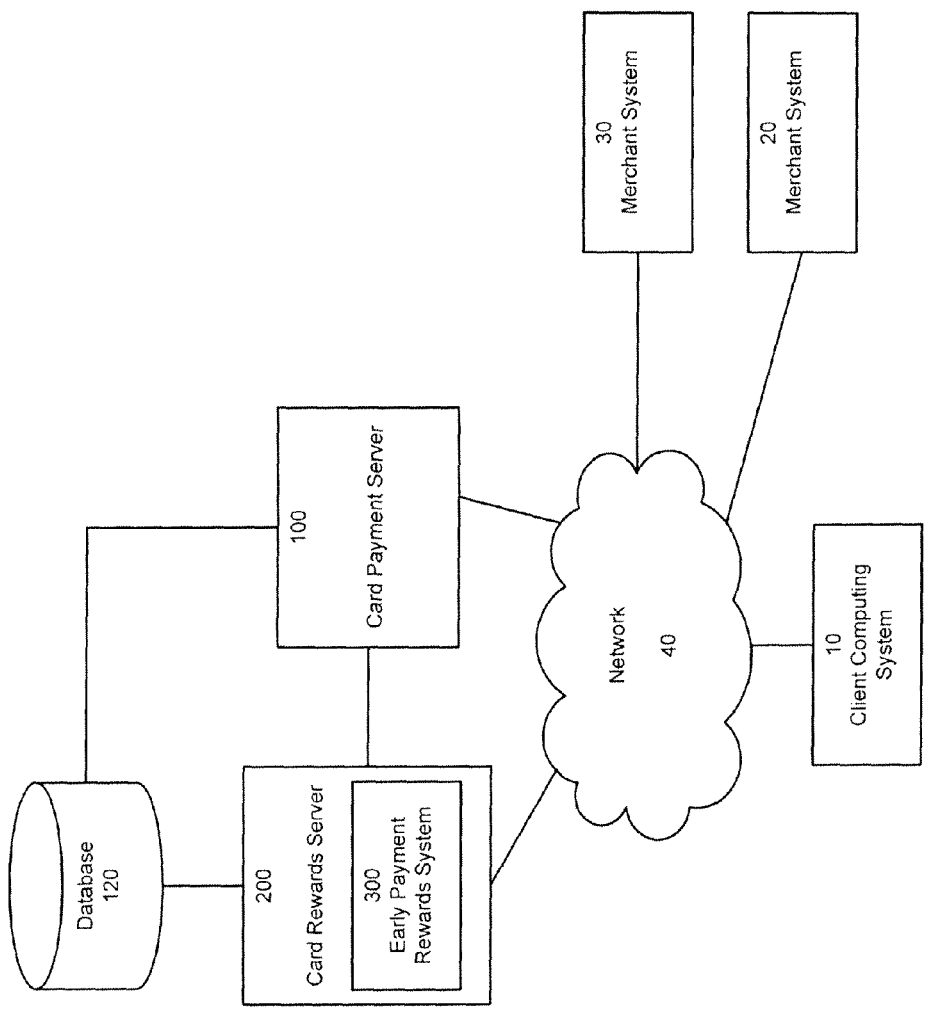
FIG. 1 is a block diagram illustrating an operating environment for an early payment rewards system in accordance with an embodiment of the invention.

FIG. 1 is a block diagram illustrating an operating environment for an early payment rewards system in accordance with an embodiment of the invention. A card payment server 100 may be connected with a card rewards server 200 including an early payment rewards system 300. The card payment server 100 and card rewards server 200 may be connected with one or more databases 120 including client account histories and other information.

Additionally, the card payment server 100 and card rewards server 200 may be connected over a network 40 with at least one client computing system 10 and multiple merchant systems 20, 30.

The card payment server 100 may be any type of system known in the art for receiving and processing credit payments.

The card rewards server 200, although shown as a separate system, may be integrated with the card payment server 100. The card rewards server 200 may contain components for determining rewards for each individual participant account. Rewards processed by the card rewards server 200 may, for example, include cash, airline miles, reward points, services, goods, rebates, up front payments, statement credit, discounts or combinations thereof.

The early payment rewards system 300 may determine if a participant is eligible for early payment rewards and may further determine the reward amount and deposit the reward amount in each participant account.

The client computing system 10 may be implemented by card holders to access the card payment server 100. The card holders may include consumer credit card holders or small business or other business card holders. The client computing system 10 may obtain balance information and may implement software modules in order to schedule and execute bill payment. In embodiments of the invention, the client computing system 10 may also access the card rewards server 200 in order to determine a reward balance and to access card rewards in order to make purchases.

Merchant systems 20, 30 may accept credit cards presented by card holders in order to pay for merchandise. The card payment server 100 receives a payment request transmitted from the merchant systems 20, 30.

Figure 2:
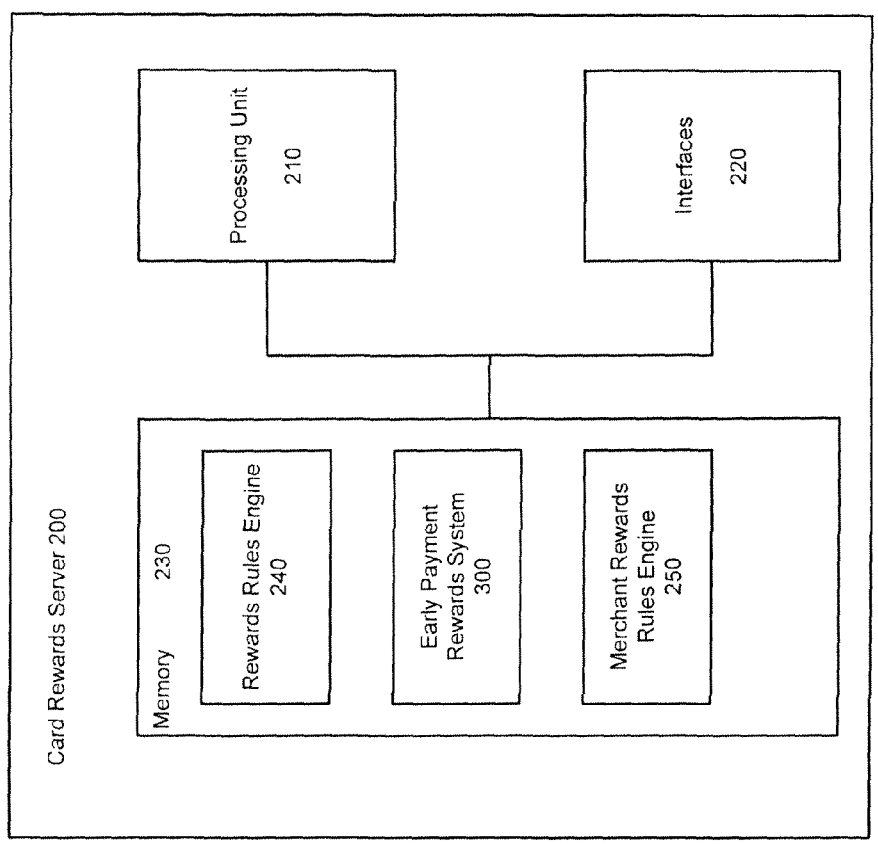
FIG. 2 is a block diagram illustrating a card rewards server for operating in conjunction with the early payment rewards system in accordance with an embodiment of the invention.

FIG. 2 illustrates an embodiment of the card rewards server 200. The card rewards server 200 may be or include a computer including a processing unit 210, interfaces 220, and memory 230. The memory may include multiple modules, engines, or components to be executed by the processing unit 210 or by other processing units. The memory 230 may store a rewards rule engine 240, the early payment rewards system 300, and the merchant rewards rules engine 250.

The rewards rules engine 240 may store general rules for granting rewards points to card holders. For example, the rewards rules engine 240 may store general rules for granting rewards based on participant spending.

The merchant rewards rules engine 250 may contain and process rules related to rewards from specific merchants. For example, purchases from specific merchants may generate double rewards or may generate specific types of rewards.

Figure 3:
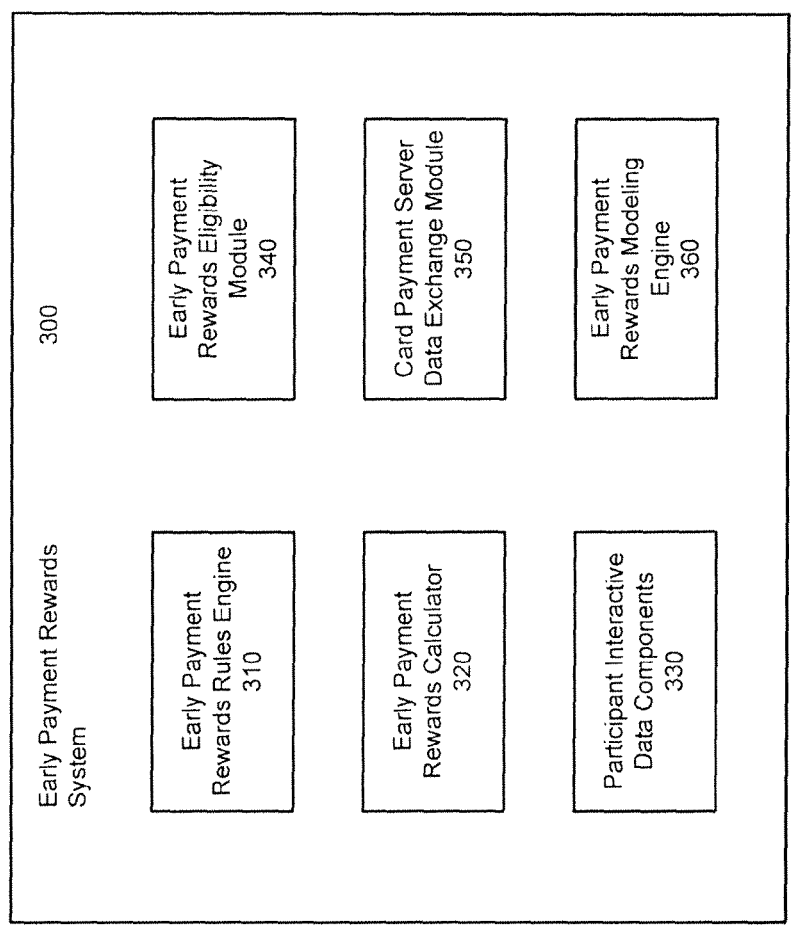
FIG. 3 is a block diagram illustrating an early payment rewards system in accordance with an embodiment of the invention.

FIG. 3 illustrates an early payment rewards system 300 in accordance with an embodiment of the invention. The early payment rewards system 300 may include an early payment rewards rules engine 310, an early payment rewards calculator 320, and a participant interactive data components 330. The early payment rewards system 300 may additionally include an early payment rewards eligibility module 340, a card payment server data exchange module 350, and an early payment rewards modeling engine 360.

The early payment rewards rules engine 310 may store and implement rules related to conditions under which rewards may be granted for early payment. The early payment rewards rules engine 310 may additionally store rules for determining a reward amount.

The early payment rewards calculator 320 may be operable to calculate a reward amount for early payment. The early payment rewards calculator 320 may calculate a reward amount based on rules stored in the early payment rewards rules engine 310.

The participant interactive data components 330 may interact with available databases in order to retrieve participant information and additionally to store newly generated participant information.

The early payment rewards eligibility module 340 may determine whether a card holder is eligible to become a participant in an early payment rewards program. Eligibility may be based on a level of revolving balance, average payment date, account fees generated, and other factors.

The card payment server data exchange module 350 may retrieve data from the card payment server 100 or receive data transmitted from the card payment server 100. The card payment server data exchange module 350 may further transmit processed data to the card payment server 100.

The early payment rewards modeling engine 360 may create models for eligibility and for generating rewards based on detected patterns. For instance, the modeling engine 360 may determine that profitability increases if early payment rewards are granted to accounts having a balance above a specific threshold and may implement this information to create and modify rules for early payment rewards.

All of the components shown in FIGS. 1-3 may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The early payment rewards system 300 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 4:
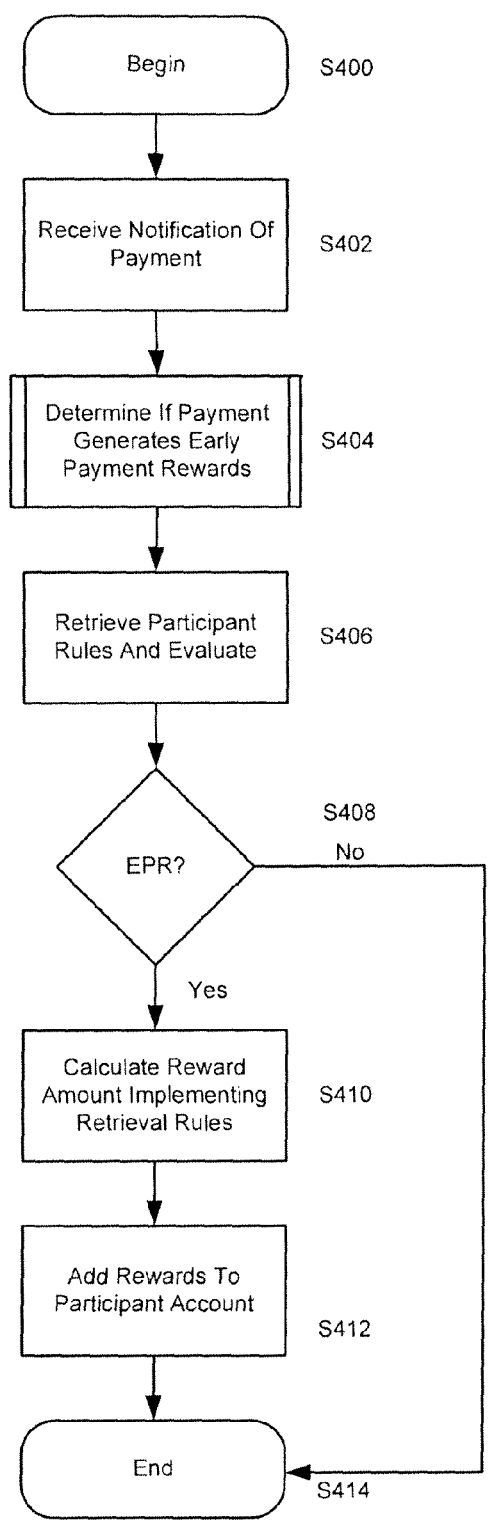
FIG. 4 is a flow chart illustrating processing for generation of early payment rewards in accordance with an embodiment of the invention.

FIG. 4 is a flow chart illustrating processing for generation of early payment rewards in accordance with an embodiment of the invention. The method begins in S400 and the card rewards server receives notification of a payment in S402. This notification may be pushed by the payment server or pulled by the card rewards server. The notification may occur in real time or at regularly scheduled intervals. Furthermore, the notification may occur for a single card holder or for multiple cardholders simultaneously. In S404 the card rewards server may determine if the received payments generate early payment rewards. The process of making this determination is further described with reference to FIG. 5. In S406, the early payment rewards system may retrieve and evaluate participant rules. In S408, the early payment rewards system determines if the payment is eligible for early payment rewards. If the payment is not eligible, the process ends in S414. If the payment is early payment rewards eligible, the early payment rewards system calculates a reward amount implementing retrieved rules in S410. In S412, the early payment rewards system adds rewards to the appropriate account or accounts and the process ends in S414.

Figure 5:
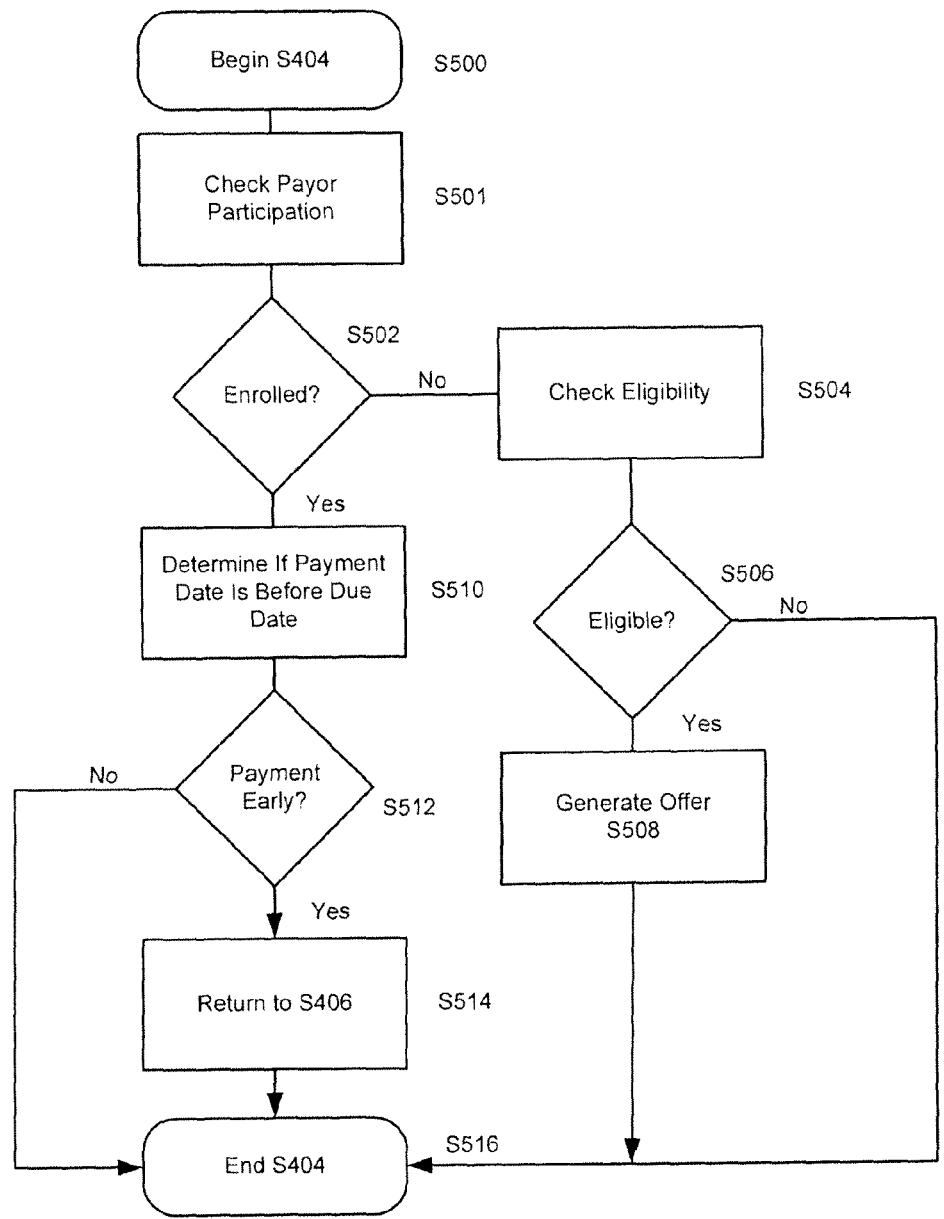
FIG. 5 is a flow chart illustrating a process for determining if a payment generates early payment rewards in accordance with an embodiment of the invention.

FIG. 5 is a flow chart illustrating a process for determining if a payment generates early payment rewards in accordance with an embodiment of the invention. The process begins in S500 in which the determination process of S404 of FIG. 4 is performed. In S501, the early rewards payment system checks payor participation. In S502, if the payor is enrolled in the early rewards payment plan, the early payment rewards system determines if the payment date is before the due date in S510. If the early payment rewards system determines in S512 that the payment is early, the early payment rewards system returns to S406 of FIG. 4 in S514 in order to arrive at an award amount and the process ends in S516. If the payor is not enrolled in the early payment rewards program in S502, the early payment rewards system checks eligibility in S504. If the participant is not eligible in S506, the process ends in S516. If the payor is eligible in S506, the early payment rewards system may generate an offer in S508 and the process ends in S516.

As an example, a credit card issuer mails a statement including a minimum payment due and a total balance due. The statement may list a due date of November 25 for payment of the minimum balance in order to avoid fees. In order to receive early payment rewards, the card holder may pay the entire balance on November 5. Thus, in S502 above, the early payment rewards system determines if the payor is enrolled in the early rewards payment plan. In S510, the early payment rewards system determines that the payment date of November 5$^{th}$ is prior to the due date of November 25$^{th}$. When the early payment rewards system determines in S512 that the payment is early, the early payment rewards system returns to S406 of FIG. 4 in S514 in order to arrive at an award amount and the process ends in S516 by returning to S406 of FIG. 4. In embodiments of the invention, the early payment rewards system may determine if the entire balance has been paid prior to proceeding to determine a reward amount. In other embodiments of the invention, the early payment rewards system may proceed to determination of a reward amount without determining that an entire balance has been paid. The early payment rewards system may determine that a threshold dollar amount has been paid, that a threshold balance percentage has been paid, or merely that the minimum payment was made at an early date. Furthermore, in embodiments of the invention, any early payment may be eligible for rewards for participants in the early payment rewards program, regardless of the payment amount. In these embodiments, the aforementioned determinations may be postponed and applied during a reward amount determination step. Although the process described above may be implemented as an automated process, it may also be implemented manually by rewards program personnel. An enrollee may contact a customer service representative for example, by telephone or electronic mail, and request correction of automated actions taken.

Figure 6:
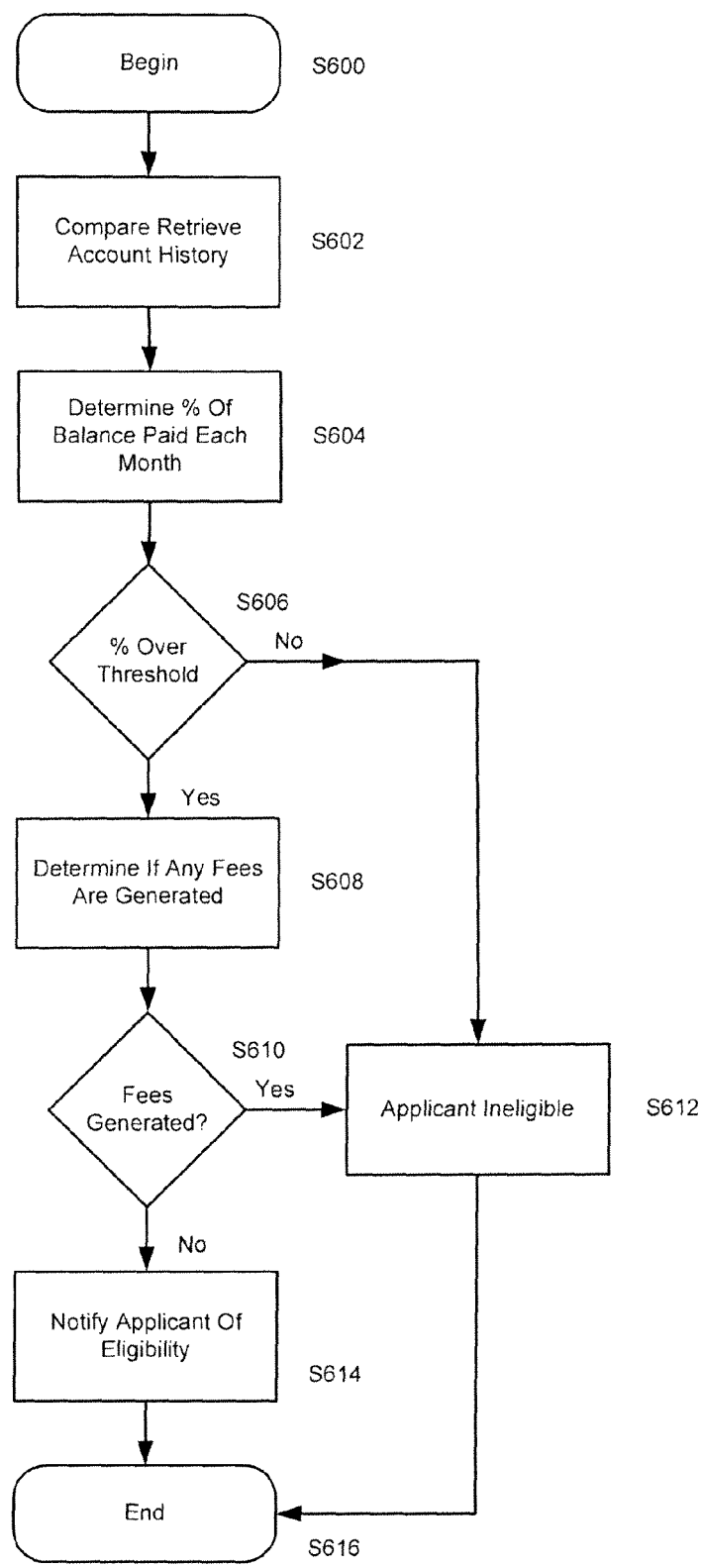
FIG. 6 is a flow chart illustrating determination of cardholder eligibility for early payment rewards in accordance with an embodiment of the invention.

FIG. 6 is a flow chart illustrating determination of cardholder eligibility for participation in an early payment rewards program in accordance with an embodiment of the invention. The method begins in S600 and the early payment rewards system retrieves a cardholder account history in S602. In S604, the early payment rewards system may evaluate the cardholder's average payment to determine an average percentage of credit card balance paid. If on average, the credit card holder pays 100% of the credit card balance, the credit card holder will be eligible for the early rewards payment program. However, as shown in S606, the cardholder's eligibility may be evaluated based on an alternative threshold. For example, if the cardholder pay's over 80% of the credit card balance each month, the credit card holder may be eligible for the early rewards payment program. If the cardholder averages payment of a sufficient percentage of the balance in S606, the early payment rewards system may determine in S608 if any fees are generated by the cardholder payment patterns. For example, if the over-credit limit fees are generated, the cardholder may be ineligible for the early rewards payment program. Thus, if such fees are generated in S610, the applicant may be deemed ineligible in S612. If no fees are generated by the card holder's account in S610, the cardholder may be notified of eligibility in S614 and the process ends in S616.

In aspects of the invention, the early rewards payment program may be offered through a web site or through a mail-in campaign or other mode. The offer may be made to all card holders and the process described above with respect to FIG. 6 may be performed for all applicants attempting to accept the offer. Alternatively, the process described above with reference to FIG. 6 may be performed as a pre-screening process and only applicants who have passed the pre-screening process may be offered membership. As a further alternative, pre-screened card holders may receive an offering through one mode, such as a mailing to pre-screened card holders and the offer may also be available on a web site to all card holders. Applicants applying through the web site would be screened upon application. As a further alternative, cardholders may contact rewards program administration through a telephone interface or via email and simply request enrollment.

Depending upon a card holder profile, the early payment rewards system may select a predetermined early rewards program structure or may adjust a standard early rewards program structure to accommodate a particular approved card holder. Furthermore, a determination process may be applied to each payment to determine an early payment rewards amount as set forth in FIG. 7.

Figure 7:
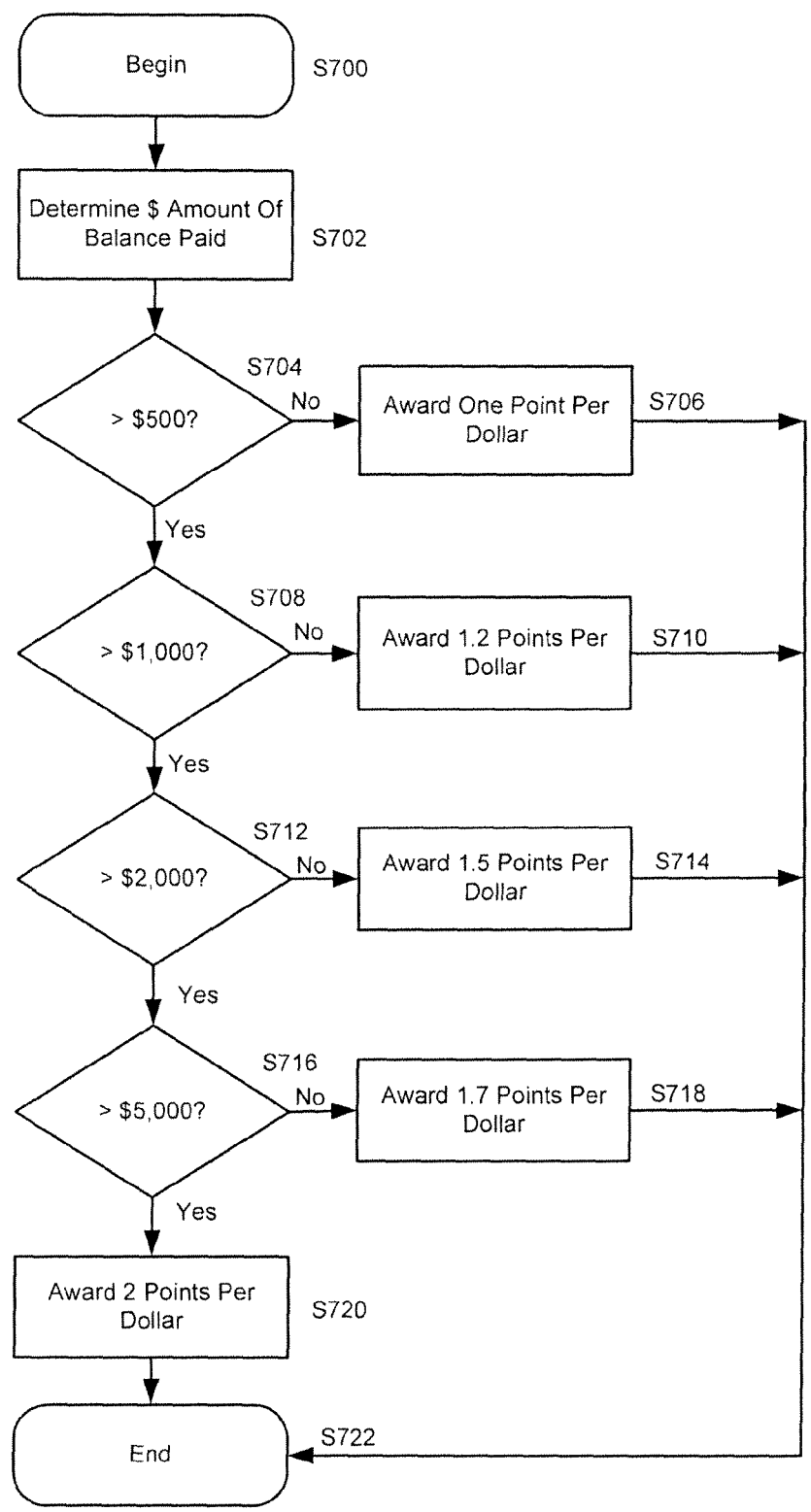
FIG. 7 is a flow chart illustrating a determination process for determining an early payment rewards amount in accordance with an embodiment of the invention.

FIG. 7 is a flow chart illustrating a determination process for determining an early payment rewards amount in accordance with an embodiment of the invention. The process begins in S700 and in S702, the early payment rewards system determines a dollar (and/or other currency type) amount of the balance paid. In the illustrated example, in S704, the early payment rewards system determines if the balance is over $500. If the balance does not exceed $500, the early payment rewards system may award one point per dollar in S706. If the balance does exceed $500, the early payment rewards system may determine in S708 if the balance exceeds $1000. If the balance does not exceed $1000 in S708, the early payment rewards system may award 1.2 points per dollar in S710. If the balance does exceed $1000, the early payment rewards system may determine if the balance exceeds $2000 in S712. If the balance does not exceed $2000, the early payment rewards system may award 1.5 points per dollar in S714. If the balance does exceed $2000, the early payment rewards system may determine in S716 if the balance exceeds $5000. If the balance does not exceed $5000 in S716, the early payment rewards system may award 1.7 points per dollar in S718. If the balance does exceed $5000 in S716, the early payment rewards system may award two points per dollar in S720. The process ends in S722. The particular dollar and point value amounts set forth above are used for descriptive purposes only and should not be construed as limiting. Further structures may be available for determining rewards, for instance a "$1/10$ net 30" structure may be provided that encourages card holders to pay within 10 days of receipt in order to receive 1 percent off their bill or "$2/10$ net 30" to receive a 2% discount if paid within 10 days. In either case, if not paid within 10 days, the full bill is due within 30 days.

Although the example provided above focuses on monetary rewards, many types of rewards may be generated. Rewards may, for example, include cash, airline miles, reward points, services, goods, rebates, up front payments, statement credit, discounts or combinations thereof.

Thus, the process of FIG. 7 may be generally performed using pre-set tiers such as those set forth above. With the general tiers, a cardholder may qualify for one of these tiers based upon a cardholder profile. The cardholder profile may include payment date history as well as monthly expenditure history. Both monthly expenditure history and payment history may be implemented by the system to select a tier for the early rewards program. Alternatively, pre-set payment amounts or revolving balance amounts may be evaluated on a different scale for each individual participant.

Figure 8:
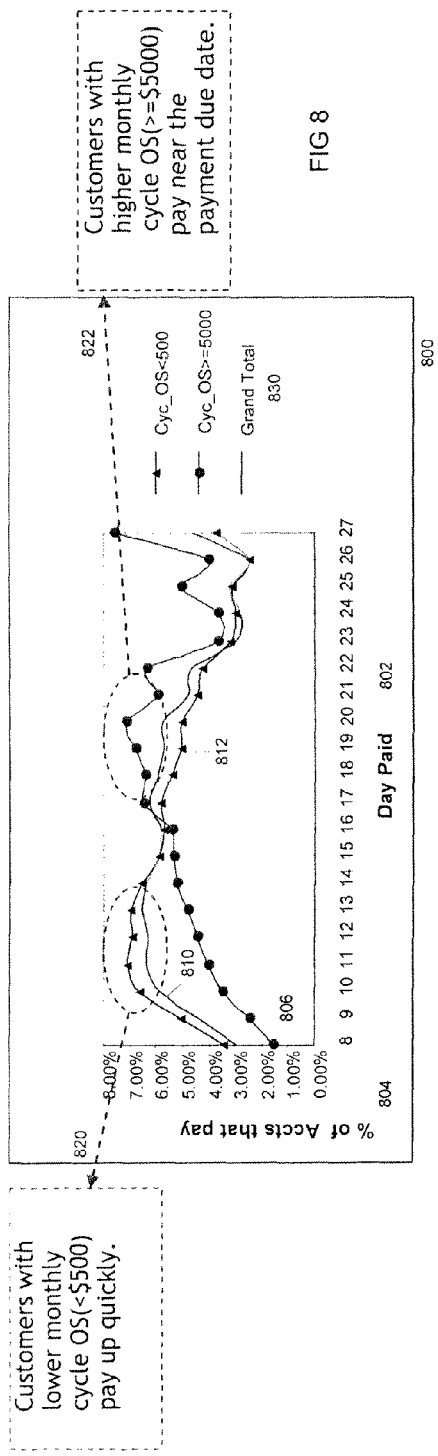
FIG. 8 is a graph of payment curves illustrating payment patterns considered in accordance with an embodiment of the invention.
Figure 9:
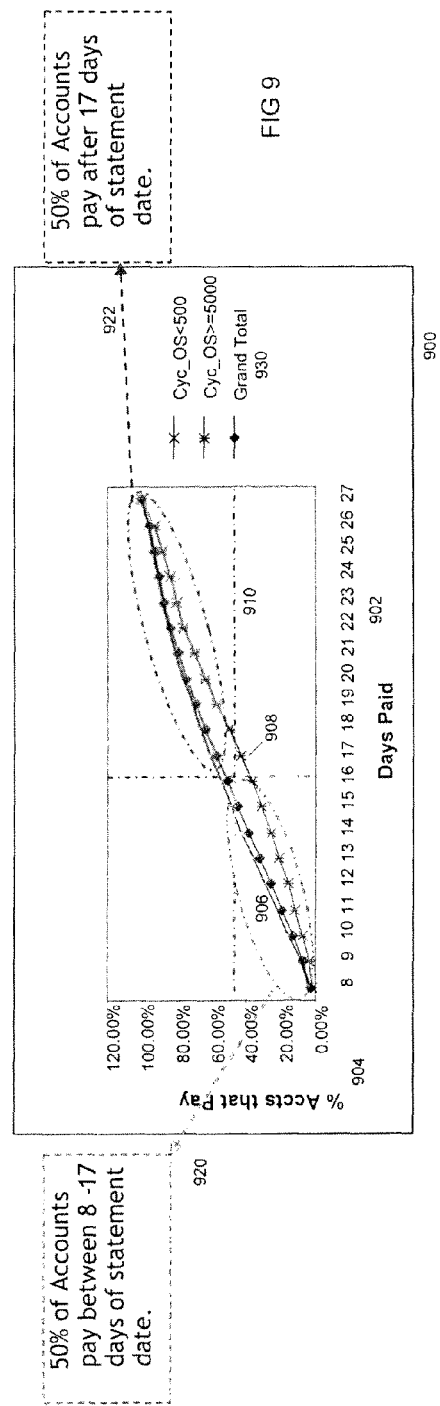
FIG. 9 is a graph of payment curves illustrating payment patterns addressed in accordance with an embodiment of the invention.

The problem addressed by embodiments of the invention is graphically illustrated in FIGS. 8 and 9. FIG. 8 is a graph 800 of payment curves illustrating payment patterns considered in accordance with an embodiment of the invention. An x-axis 802 may represent a date of payment and a y-axis 804 may represent percentage of accounts that pay. A line 806 represents accounts having a balance greater than or equal to $5000. Triangular symbols 812 represent accounts having a balance of less than $500. The circled portion 820 illustrates that customers having lower monthly balances (less than $500) tend to pay quickly. Circled portion 822 illustrates that customers with higher monthly balances (greater than $5000) tend to pay near the payment due date. Thus, the funding burden for credit issuers clearly is more onerous with card holders having higher balances as these card holders tend to postpone bill payment.

FIG. 9 is a graph 900 of payment curves illustrating payment patterns addressed in accordance with an embodiment of the invention. An x-axis 902 represents days paid and a y-axis 904 represents % of accounts that pay. Line 908 represents balances of greater than $5000 and line 906 represents a grand total. Circled area 920 illustrates that 50% of accounts pay between eight and seventeen days of the statement date. Area 922 illustrates that 50% of accounts pay 17 days or more after the statement date. Thus, embodiments of the invention are directed to minimizing impact of the accounts that pay in the latter half of the cycle and accounts associated with large total monthly expenditures.

Figure 10:
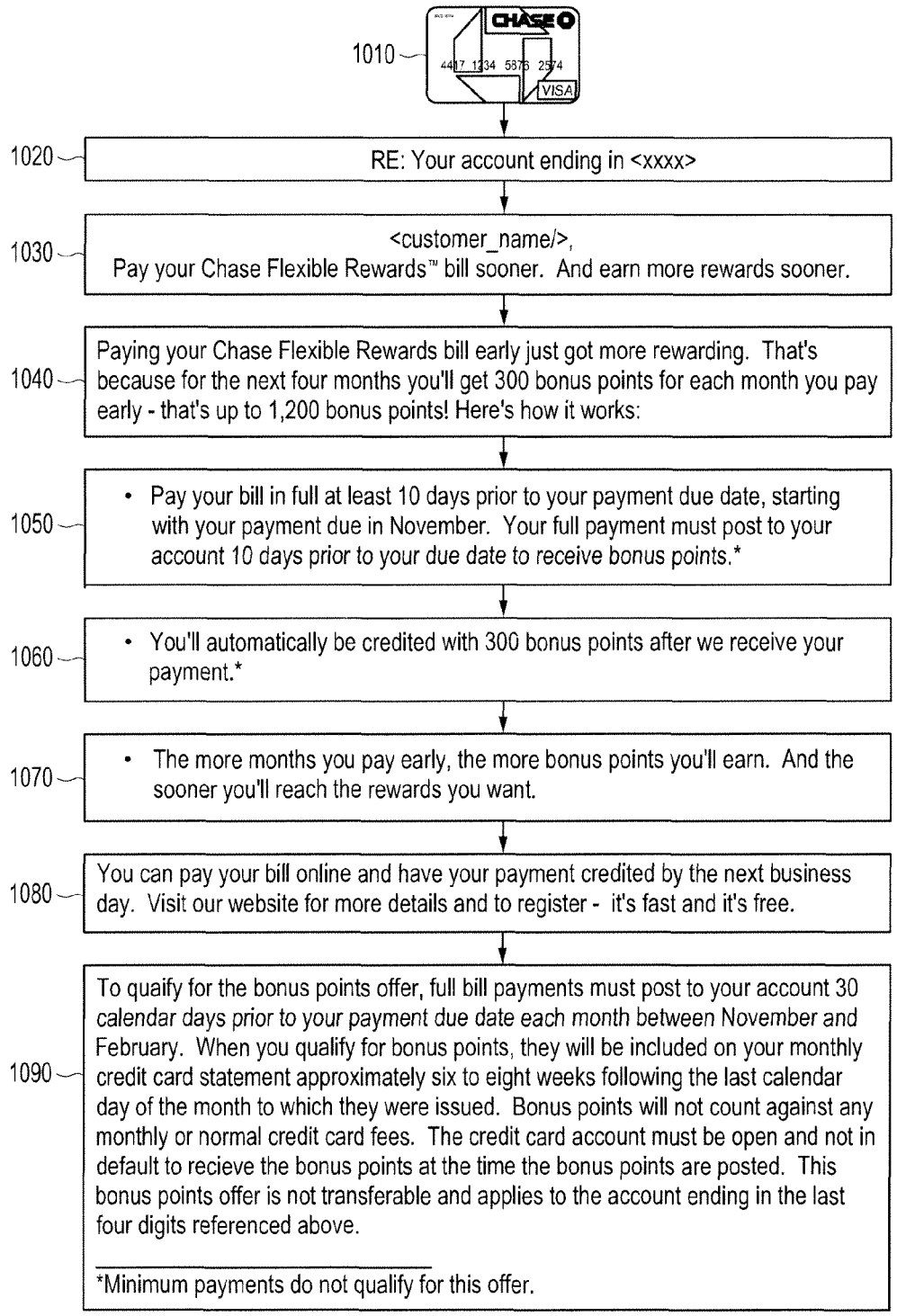
FIG. 10 is a graphic program description directed at card holders.

FIG. 10 illustrates a graphic program description 1000 for mailing or otherwise transmitting to card holders. The description 1000 includes a card depiction 1010, an account and customer identifier 1020, and a brief program description 1030. An introductory offer 1040 is provided to the card holder for a four month period. Terms of payment are provided at 1050 and credit is explained at 1060. Further promotional information 1070 is provided to explain that rewards are cumulative and early payment on a monthly basis maximizes rewards. Available techniques for bill payment are described at 1080. Fine print 190 may be provided to include foot notes and legally required information.

Thus, a system and method are provided that identify transactor accounts and other qualified accounts and offer an early payment rewards program to holders of these accounts. Upon enrollment in an early payment rewards program, transactors may receive rewards if they pay before the due date. The system may calculate a timeliness index and determine additional rewards based on timeliness of payment. In other embodiments, the system may make the additional rewards available to all credit card holders without regard for whether the card holders are transactors or revolvers.

Furthermore, in embodiments of the invention, the additional rewards may be based on the card holder's balance. Payoff of larger balances at an early date may generate larger rewards. Although card holders may be generating interest income due to their retention of the funds, this interest income is often a very small percentage offered through the card holder's checking account. Thus, it is possible for the card issuer to offer rewards that may have greater value to the card holder than the small amount of interest the card holder is likely to receive by retaining the funds in a checking account for those extra days.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computerized credit card early payment rewards system for reducing funding burden incurred by credit issuers by rewarding early payment for participating card holders, the system comprising:
   at least one computer memory storing data and instructions;
   at least one computer processor accessing the computer memory and executing: the stored instructions to perform steps including:
   accessing an eligibility rules module for determining eligibility of each participating card holder to participate in the early payment rewards system, wherein determining includes:

identifying card holders having a payment history illustrating payment of an entire credit balance each month; and determining whether each of the identified card holders generates an account-related fee total less than or equal to a pre-selected threshold;

creating models for eligibility for early rewards using an early payment rewards modeling engine by determining whether card issuer profitability increases if early payment rewards are granted based on card holder balance and providing the models to the eligibility rules module;

offering the early payment rewards program to the selected card holders, wherein upon enrollment in the early payment rewards program the selected card holders receive rewards for early payment behavior;

receiving payment data from a card payment server through a card payment server exchange module;

applying early payment rewards rules from an early payment rewards rules engine to receive payment data from participating card holders;

calculating, using an early payment rewards calculator, a reward amount based on application of the rules from the early payment rewards rules engine; and depositing the calculated rewards in a participating card holder account.

2. The system of claim 1, wherein the early payment rewards rules engine comprises date-related rules for assessing whether a payment date qualifies for early payment rewards.

3. The system of claim 1, wherein the early payment rewards rules engine comprises balance-related rules for determining whether a payment qualifies for an early payment reward based upon balance paid.

4. A computer-implemented method for reducing funding burden on a credit issuer by offering an early payment rewards program to qualified card holders, the method comprising:

storing, in at least one computer memory, data and instructions;

accessing the at least one computer memory using at least one computer processor and executing the instructions to perform steps including:

identifying card holders having a payment history illustrating payment of an entire credit balance each month;

determining whether each of the identified card holders generates an account-related fee total less than or equal to a pre-selected threshold;

selecting, with an early payment rewards eligibility module, the card holders having a history of payment of the entire credit balance each month and generating account-related fees less than or equal to the pre-selected threshold;

creating models for eligibility for early rewards using an early payment rewards modeling engine by determining whether card issuer profitability increases if early payment rewards are granted based on card holder balance and providing the models to the early payment rewards eligibility module;

offering the early payment rewards program to the selected card holders, wherein upon enrollment in the early payment rewards program the selected card holders receive rewards for early payment behavior;

receiving notification of a payment at an early payment rewards system;

determining, with an early payment rewards rules engine, if the received payment generates early payment rewards;

evaluating the received payment based on retrieved early payment rules to calculate a reward amount; and adding the calculated reward amount to a participant account.

5. The method of claim 4, wherein adding the calculated reward amount to a participant account comprises adding rewards including at least one of cash, airline miles, reward points, services, goods, rebates, up front payments, statement credit, and discounts.

6. The method of claim 4, further comprising determining if the received payment generates early payment rewards by determining if the payor is a participating cardholder.

7. The method of claim 4, further comprising determining if the received payment generates early payment rewards by determining if the received payment qualifies as an early payment.

8. The method of claim 4, wherein evaluating the received payment comprises determining a reward amount based on early payment reward rules specifying a required date of payment.

9. The method of claim 8, wherein evaluating the received payment comprises determining the reward amount based on early payment reward rules specifying a balance percentage paid.

10. The method of claim 9, further comprising setting the balance percentage of the early payment reward rules at one hundred percent.

11. The method of claim 8, further comprising determining the calculated reward amount based on a number of days prior to a due date on which payment is received.

12. The method of claim 8, further comprising determining the calculated reward amount based upon a total dollar amount paid during a relevant month.

* * * * *